US011410557B2

(12) United States Patent
Matsuda et al.

(10) Patent No.: US 11,410,557 B2
(45) Date of Patent: Aug. 9, 2022

(54) PARKING ASSISTANCE DEVICE (71) Applicant: Hitachi Automotive Systems, Ltd., Hitachinaka (JP)

(72) Inventors: Satoshi Matsuda, Hitachinaka (JP); Yoshiyuki Yoshida, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 72 days.

(21) Appl. No.: 16/978,978

(22) PCT Filed: Feb. 7, 2019

(86) PCT No.: PCT/JP2019/004340
§ 371 (c)(1),
(2) Date: Sep. 8, 2020

(87) PCT Pub. No.: WO2019/181260
PCT Pub. Date: Sep. 26, 2019

(65) Prior Publication Data
US 2021/0366285 A1    Nov. 25, 2021

(30) Foreign Application Priority Data
Mar. 22, 2018    (JP) .............................. JP2018-055274

(51) Int. Cl.
*G08G 1/16* (2006.01)
*B60W 30/06* (2006.01)
(Continued)

(52) U.S. Cl.
CPC ............. *G08G 1/168* (2013.01); *B60W 30/06* (2013.01); *B62D 15/0285* (2013.01);
(Continued)

(58) Field of Classification Search
CPC ......... B60W 2420/42; B60W 2420/54; B60W 2540/215; B60W 2554/20;
(Continued)

(56) References Cited

U.S. PATENT DOCUMENTS

2014/0244070 A1* 8/2014 Inagaki ............. B62D 15/0285
701/1
2015/0258989 A1* 9/2015 Okano .................. B60W 30/06
701/1
(Continued)

FOREIGN PATENT DOCUMENTS

CN    106394674 A  *  2/2017  .......... B60W 10/184
CN    112053582 A  *  12/2020  ............ B60W 30/06
(Continued)

OTHER PUBLICATIONS

International Search Report with English translation and Written Opinion issued in corresponding application No. PCT/JP2019/004340 dated May 14, 2019.

*Primary Examiner* — Atul Trivedi
(74) *Attorney, Agent, or Firm* — Foley & Lardner LLP (57) ABSTRACT A parking support device is provided which, when calculating a parking route followed by a host vehicle, calculates the parking route based on the reliability of obstacle information acquired by a sensor mounted on the host vehicle, thereby improving the convenience of a driver of the host vehicle.
A parking support device 10 includes an obstacle information analysis unit 303 that recognizes an external world from external world information detected by a camera 2 and a sonar 3 that acquire the external world information, and a parking route calculation unit 304 that calculates a parking route of a host vehicle 1 based on information on an obstacle in the external world recognized by the obstacle information analysis unit 303, and the parking route calculation unit 304

(Continued)

sets a distance between the obstacle and the host vehicle 1 in the parking route according to a degree of reliability of information on the obstacle.

6 Claims, 7 Drawing Sheets

(51) Int. Cl.
  *B62D 15/02* (2006.01)
  *B60W 50/14* (2020.01)
(52) U.S. Cl.
  CPC ....... *B60W 50/14* (2013.01); *B60W 2050/146* (2013.01); *B60W 2420/42* (2013.01); *B60W 2420/54* (2013.01); *B60W 2540/215* (2020.02); *B60W 2554/20* (2020.02); *B60W 2554/801* (2020.02); *B60W 2554/802* (2020.02)
(58) Field of Classification Search
  CPC ..... B60W 2554/801; B60W 2554/802; B60W 30/06; B60W 2050/146; B60W 50/14; G08G 1/168; B62D 15/0285
  USPC .......................................................... 701/25
  See application file for complete search history.

(56) References Cited

U.S. PATENT DOCUMENTS

| | | | | |
|---|---|---|---|---|
| 2015/0375740 A1* | 12/2015 | Okamura | ........... | B62D 15/0285 701/25 |
| 2016/0075326 A1* | 3/2016 | Kiyokawa | ............. | B60K 35/00 701/41 |
| 2016/0075328 A1* | 3/2016 | Kiyokawa | ............. | B60W 30/06 701/41 |
| 2017/0028914 A1* | 2/2017 | Kiyokawa | .......... | B62D 15/0285 |
| 2017/0028984 A1* | 2/2017 | Kiyokawa | ............. | G01S 15/931 |
| 2017/0028985 A1* | 2/2017 | Kiyokawa | ............. | G05D 1/0088 |
| 2017/0029027 A1* | 2/2017 | Mizutani | ................ | B62D 6/002 |
| 2017/0029028 A1* | 2/2017 | Kiyokawa | ............. | G08G 1/168 |
| 2017/0032679 A1* | 2/2017 | Tomozawa | ........... | B62D 15/027 |
| 2017/0032680 A1* | 2/2017 | Imai | .................... | G01C 21/3629 |
| 2017/0032681 A1* | 2/2017 | Tomozawa | ......... | B62D 15/0285 |
| 2017/0253236 A1* | 9/2017 | Hayakawa | ............. | G08G 1/143 |
| 2018/0043905 A1* | 2/2018 | Kim | ........................ | B60W 50/10 |
| 2018/0072313 A1* | 3/2018 | Stenneth | ................. | G01S 17/89 |
| 2019/0100198 A1* | 4/2019 | Hakki | ............... | B60W 30/0956 |
| 2019/0291713 A1* | 9/2019 | Kogure | .................. | B60W 20/11 |
| 2020/0298838 A1* | 9/2020 | Sugae | ................ | B62D 15/0285 |
| 2021/0178968 A1* | 6/2021 | Yamanaka | ................ | B60R 1/00 |
| 2021/0179078 A1* | 6/2021 | Nakada | ................ | G06V 20/588 |
| 2021/0300337 A1* | 9/2021 | Fujitani | .............. | B62D 15/0285 |
| 2021/0300341 A1* | 9/2021 | Shoda | ................... | B60W 30/06 |
| 2021/0309254 A1* | 10/2021 | Murahashi | ......... | B60W 60/0011 |
| 2021/0365701 A1* | 11/2021 | Eshet | ................. | G01C 21/3848 |
| 2021/0380099 A1* | 12/2021 | Lee | .................. | B60W 30/18163 |
| 2022/0080996 A1* | 3/2022 | Brown | ............... | G01C 21/3407 |
| 2022/0081003 A1* | 3/2022 | Brown | ............... | B60W 30/143 |
| 2022/0081005 A1* | 3/2022 | Brown | .................. | B60W 40/06 |
| 2022/0113745 A1* | 4/2022 | Panigrahi | ................. | G06T 7/11 |

FOREIGN PATENT DOCUMENTS

| | | | | |
|---|---|---|---|---|
| CN | 112572415 A | * | 3/2021 | ............ B60W 30/06 |
| CN | 112644471 A | * | 4/2021 | ............ B60W 30/06 |
| DE | 112019000342 T5 | * | 9/2020 | ......... B62D 15/0285 |
| EP | 3124327 A1 | * | 2/2017 | ............. B60Q 9/008 |
| EP | 3124359 A1 | * | 2/2017 | ............. B60T 7/042 |
| EP | 3124360 A1 | * | 2/2017 | ............. B60Q 9/005 |
| EP | 3124995 A1 | * | 2/2017 | ......... B60W 10/184 |
| EP | 3650285 B1 | * | 9/2021 | ............. B60K 35/00 |
| JP | 2010-018180 A | | 1/2000 | |
| JP | 2015081022 A | * | 4/2015 | ......... B60K 31/0008 |
| JP | 2017218043 A | * | 12/2017 | ............. B60R 21/00 |
| KR | 20170141082 A | * | 12/2017 | ............ B60W 30/06 |
| WO | WO-2016039427 A1 | * | 3/2016 | ............ B60W 30/06 |
| WO | WO-2016039430 A1 | * | 3/2016 | ............ B60W 30/06 |
| WO | WO-2017212706 A1 | * | 12/2017 | ............. B60R 21/00 |
| WO | WO-2019008759 A1 | * | 1/2019 | ............. B60K 35/00 |
| WO | WO-2019008760 A1 | * | 1/2019 | ............. B60K 35/00 |
| WO | WO-2019181260 A1 | * | 9/2019 | ............ B60W 30/06 |
| WO | WO-2021162001 A1 | * | 8/2021 | |
| WO | WO-2021172532 A1 | * | 9/2021 | |

\* cited by examiner

PARKING ASSISTANCE DEVICE

TECHNICAL FIELD

The present invention relates to a parking support device that supports a driving operation of a vehicle by a driver when parking the vehicle.

BACKGROUND ART

A parking support device that supports, when a driver parks a vehicle, any or all of the driver's steering wheel operation, accelerator operation, and brake operation in order to support a driving operation of the vehicle to a target parking position is widely known. In this parking support device, first, environmental information around a host vehicle acquired by a camera or sonar mounted on the host vehicle in a parking area is analyzed, locations where the host vehicle can be parked are detected, and the detection of parkable locations is notified to an in-vehicle display device such as a navigation system. After stopping the vehicle, the driver selects, as a target parking position, a location to be parked using input means of the in-vehicle display device, from among the parkable locations displayed on the in-vehicle display device, makes the parking support start, and thus can receive support of driving operation of the vehicle from the stop position of the host vehicle to the target parking position.

As an example of such a parking support device, a parking support device and a parking support method are disclosed which, when an obstacle is detected in front of a host vehicle, support a driving operation of the host vehicle along a parking route in which the host vehicle passes near the obstacle, based on an obstacle detectable range of obstacle detection means existing around the host vehicle (see PTL 1).

CITATION LIST

Patent Literature

PTL 1: JP 2010-18180 A

SUMMARY OF INVENTION

Technical Problem

However, the parking support device described in PTL 1, when calculating a parking route in which the host vehicle passes near an obstacle, calculates the parking route so as not to collide with the obstacle detected by each sensor before start of parking support. Although also after start of the parking support, obstacle information is detected by each sensor, it is difficult to calculate a parking route in real time due to a processing load of an electronic control unit (ECU, hereinafter, referred to as ECU) or the fact that the vehicle cannot follow a sudden change in the parking route because. Therefore, in the calculation of the parking route before the start of parking support, the measurement error of a sensor mounted on the host vehicle is compensated for by providing a distance margin for each obstacle so as not to collide with the obstacle. However, if the distance margin is large, there is a problem that the route has a long distance between the obstacle and the host vehicle 1 more than necessary, and the driver feels unnatural. Further, if the distance margin is small, when distance information between the detected obstacle and the host vehicle is shorter than the actual distance, there is a problem that the vehicle may come into contact with the obstacle.

The present invention has been made to solve such a problem and has an object to provide a parking support device that, when calculating a parking route followed by a host vehicle, can improve the convenience of a driver of the host vehicle by calculating the parking route based on likelihood (hereinafter referred to as reliability) of obstacle information acquired by a sensor mounted on the host vehicle.

Solution to Problem

The parking support device according to the present invention is a parking support device for supporting parking of a host vehicle, and includes an external world information acquisition unit that acquires external world information, an external world recognition unit that recognizes an external world from the external world information acquired by the external world information acquisition unit, and a parking route calculation unit that calculates a parking route of the host vehicle based on information on an obstacle in the external world recognized by the external world recognition unit, in which the parking route calculation unit sets a distance between the obstacle and the host vehicle in the parking route according to a degree of reliability of the information on the obstacle.

Advantageous Effects of Invention

A parking support device can be provided which, when calculating a parking route followed by a host vehicle, can improve convenience of a driver of the host vehicle by setting a distance between the obstacle and the vehicle based on the reliability of obstacle information acquired by a sensor mounted on the host vehicle.

DESCRIPTION OF EMBODIMENTS

Hereinafter, a parking support device according to an embodiment to which the parking support device according to the present invention is applied will be described with reference to the drawings.

A parking support device 10 according to the present embodiment is mounted on a vehicle such as a passenger car, a truck, and a bus, and has a configuration to support a driving operation of the vehicle by a driver when the vehicle is parked at a parking section in a parking area. Hereinafter, a vehicle on which the parking support device according to the present embodiment is mounted is referred to as a host vehicle 1. Note that the front, rear, left, and right directions refer to directions viewed from a driver sitting on a driver's seat of the host vehicle 1.

Figure 1:
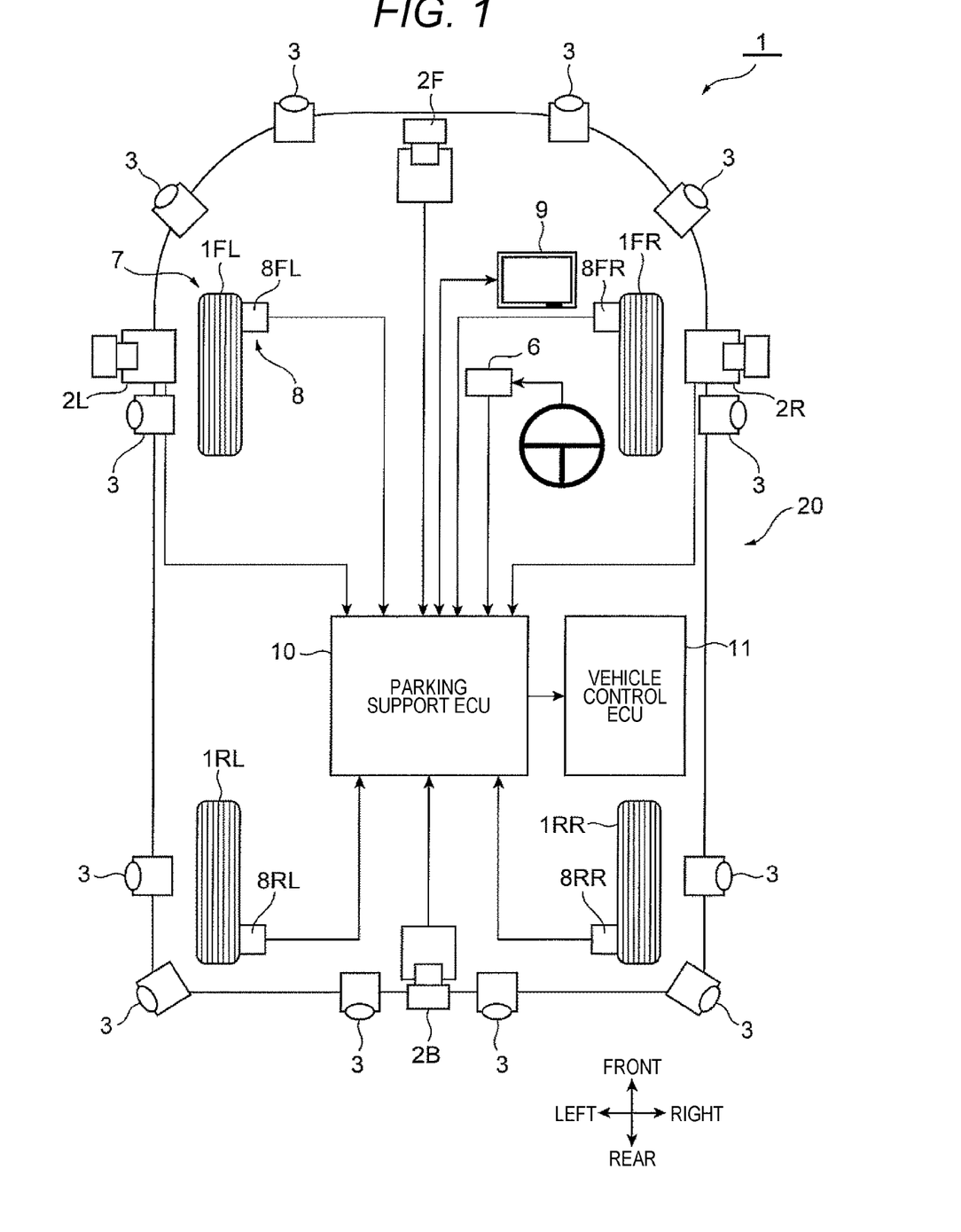
FIG. 1 is a schematic configuration diagram of a host vehicle equipped with a parking support device according to an embodiment of the present invention.

As shown in FIG. 1, the host vehicle 1 is configured by a four-wheeled vehicle including a front left wheel 1FL, a front right wheel 1FR, a rear left wheel 1RL, and a rear right wheel 1RR. Hereinafter, unless otherwise specified, the front left wheel 1FL, the front right wheel 1FR, the rear left wheel 1RL, and the rear right wheel 1RR may be collectively referred to as a wheel 1W.

As shown in FIG. 1, the host vehicle 1 has a front camera 2F, a rear camera 2B, a left camera 2L, a right camera 2R, a plurality of sonars 3, an electric power steering device 6, a front left wheel speed sensor 8FL, a front right wheel speed sensor 8FR, a rear left wheel speed sensor BRL, a rear right wheel speed sensor 8RR, an in-vehicle display device 9, a parking support ECU 10, and a vehicle control ECU 11.

The front camera 2F is mounted at the front side of the host vehicle 1, the rear camera 2B is mounted at the rear side of the host vehicle 1, the left camera 2L is mounted at the left side of the host vehicle 1, and the right camera 2R is mounted at the right side of the host vehicle 1.

Each of the front camera 2F, the rear camera 2B, the left camera 2L, and the right camera 2R includes a lens and an image sensor, and is appropriately arranged so that the surrounding environment of the host vehicle 1 can be imaged. The captured images captured by the front camera 2F, the rear camera 2B, the left camera 2L, and the right camera 2R are transmitted to the parking support ECU 10, which is a parking support device, and used as information for image processing. Hereinafter, unless otherwise specified, the front camera 2F, the rear camera 2E, the left camera 2L, and the right camera 2R are collectively referred to as a camera 2. The camera 2 may be a monocular camera or a stereo camera.

A plurality of sonars 3 are installed at the front, rear, and side of the host vehicle 1. Each sonar 3 has a configuration to emit ultrasonic waves toward surrounding obstacles and receive reflected waves reflected from surrounding obstacles. The sonar 3 measures the distance to an obstacle around the host vehicle 1 based on the received reflected waves, and the measurement result is transmitted to the parking support ECU 10. In the parking support ECU 10, obstacle information around the host vehicle 1, which is a measurement result transmitted from each sonar 3, is stored.

The camera 2 and the sonar 3 of the present embodiment are detection means for detecting the surroundings of the host vehicle 1, but may detect an obstacle around the host vehicle 1 by using other detection means other than the camera 2 and the sonar 3.

The electric power steering device 6 has a structure in which the direction of the wheel 1W is changed according to a steering angle which is an operation amount of a steering wheel provided in a driver's seat of the host vehicle 1.

The electric power steering device 6 specifically includes a steering angle sensor that detects the steering angle of the steering wheel, a motor that assists the steering torque that is a torque for changing the direction of the wheel 1W, and an electric power steering ECU that controls the steering torque (any of which is not shown), and has a structure to change the direction of the wheel 1W by controlling the steering torque so as to assist the steering wheel operation of a driver.

The steering angle detected by the steering angle sensor of the electric power steering device 6 is transmitted to the parking support ECU 10. In the parking support ECU 10, the traveling direction of the host vehicle 1 is calculated based on information on the steering angle.

The front left wheel speed sensor 8FL detects the wheel speed of the front left wheel 1FL, the front right wheel speed sensor 8FR detects the wheel speed of the front right wheel 1FR, and the rear left wheel speed sensor 8RL detects the wheel speed of the rear left wheel 1RL, and the rear right wheel speed sensor 8RR detects the wheel speed of the rear right wheel 1RR. Information on the wheel speed detected by each wheel speed sensor is transmitted to the parking support ECU 10 and is used as information of calculation processing for calculating the speed of the host vehicle 1. Hereinafter, unless otherwise specified, the front left wheel speed sensor 8FL, the front right wheel speed sensor 8FR, the rear left wheel speed sensor 8RL, and the rear right wheel speed sensor 8RR may be collectively referred to as a wheel speed sensor 8.

The in-vehicle display device 9 is provided in a cab of the host vehicle 1 and has a configuration to provide various pieces of information to the driver. The information provided to the driver includes, for example, various images such as an image captured by the camera 2 and processed by the parking support ECU 10, and an image displaying parkable locations transmitted from the parking support ECU 10 on surrounding information of the host vehicle 1 being displayed in an overlapped manner. The driver of the host vehicle 1 can determine whether or not to perform parking support with reference to these various images. Specifically, the in-vehicle display device 9 may be a touch panel in which a display and an information input device are integrated, may be a part of a car navigation system, or may be a head-up display.

The information input device of the in-vehicle display device 9 includes input devices such as a keyboard, a voice instruction device, a switch, and a push button, and is configured by a pressure-sensitive or electrostatic touch panel. Through these touch panels, various input operations such as the start of parking support are performed by the driver. When the driver performs an input operation on the touch panel, the content of the input operation is transmitted to the parking support ECU 10.

The parking support ECU 10 has a configuration to receive data on environmental information (external world information) from the camera 2 and the sonar 3, calculate locations where the host vehicle 1 can be parked, that is, parkable positions of the host vehicle 1 based on the data, and calculate surrounding obstacle information. The configuration for receiving this data constitutes the external world information acquisition unit of the present invention, and the configuration for calculating the parkable positions and surrounding obstacle information constitutes the external world recognition unit for recognizing the external world of the present invention. The parking support ECU 10 transmits the information on the parkable locations obtained by the calculation to the in-vehicle display device 9, and displays the information on the parkable locations on a screen of the in-vehicle display device 9, together with the surrounding information of the host vehicle 1 being displayed, in an overlapped manner. Thereby, the driver can receive the parking support for the recommended target parking position, that is, the target parking position selected from the parkable locations.

Further, the parking support ECU 10 has a configuration to calculate the traveling direction of the host vehicle 1 based on the information on the steering angle detected by the steering angle sensor of the electric power steering device 6. In addition, the parking support ECU 10 has a configuration to store information on obstacles around the host vehicle 1, which is a measurement result transmitted from each sonar 3, and a configuration to receive information on the wheel speed detected by each wheel speed sensor and calculate the speed of the host vehicle 1.

Further, the parking support ECU 10 has a configuration to calculate a parking route from a vehicle position, that is, a stop position of the host vehicle 1 to the selected parkable location, based on the information on the parkable location, which is displayed on the in-vehicle display device 9 and selected by the driver after the host vehicle 1 stops and the information on obstacles, and transmit the calculated parking route to the vehicle control ECU 11 (parking route calculation unit).

The calculation of the parking route here is performed based, on the reliability, which is the likelihood of the information on the obstacle acquired by the sensors such as the camera 2 and the sonar 3 of the host vehicle 1. The parking support ECU 10 calculates a parking route, and calculates a safe parking route that does not cause the host vehicle 1 to collide with an obstacle. As a result, the distance between the host vehicle 1 and the obstacle becomes appropriate so that the host vehicle 1 and the obstacle do not unnecessarily separate from each other, and the driver of the host vehicle 1 does not feel unnatural in the vehicle behavior.

Figure 2:
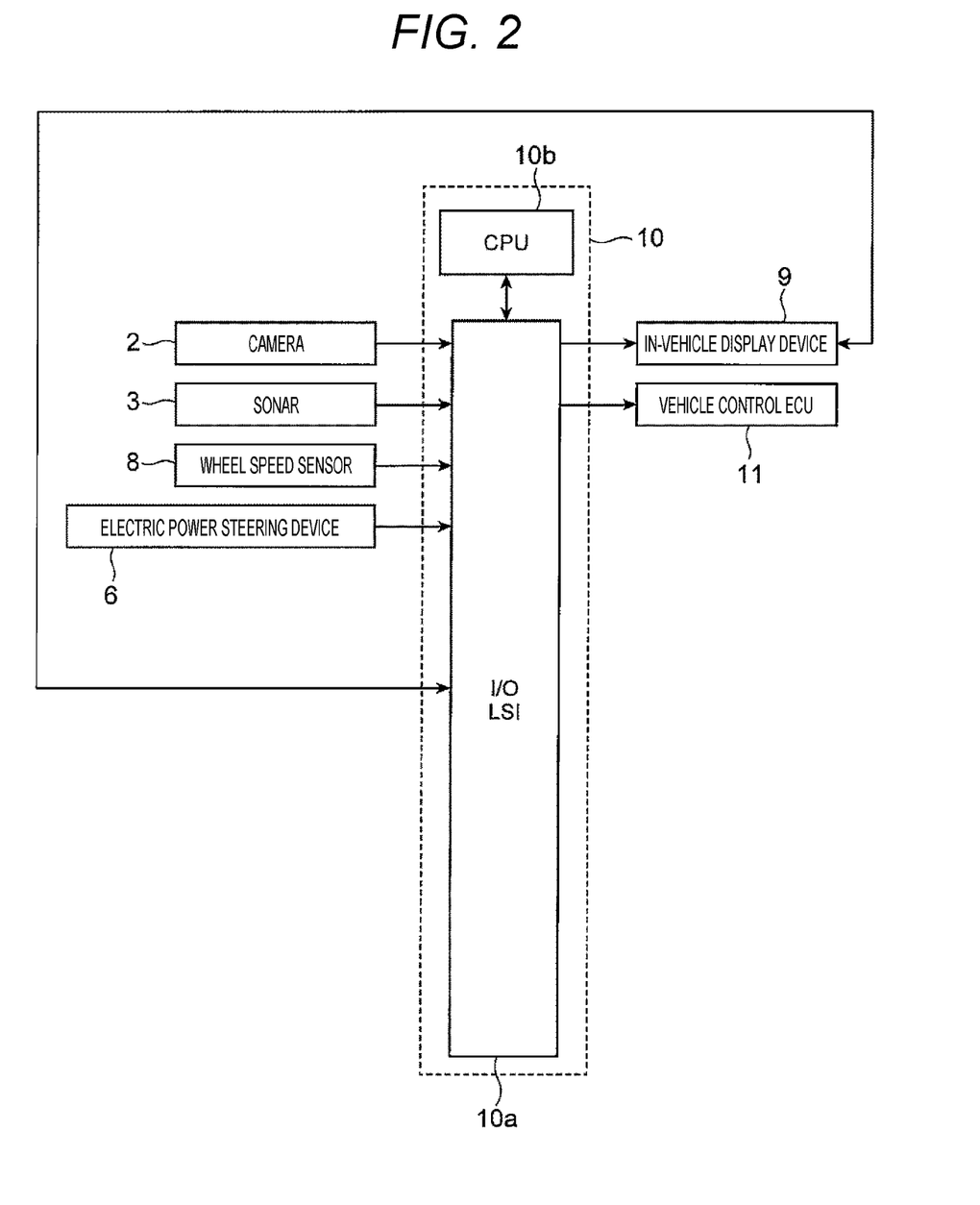
FIG. 2 is a diagram showing a schematic configuration of a parking support ECU constituting the parking support device according to the embodiment of the present invention, and is a block diagram showing a relationship between input and output signals of the parking support ECU.
Figure 3:
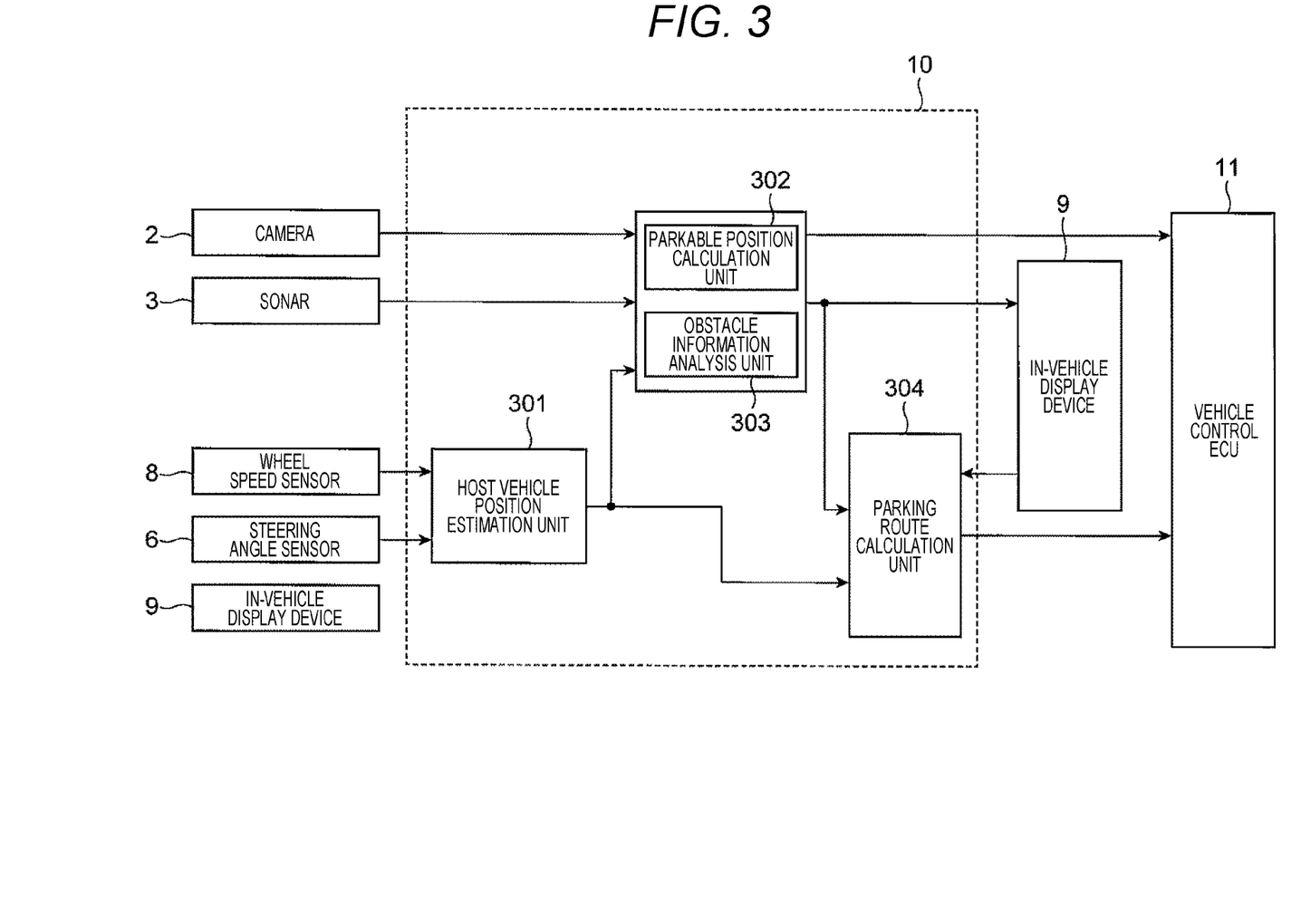
FIG. 3 is a configuration diagram showing a functional block configuration of the parking support ECU constituting the parking support device according to the embodiment of the present invention.

The parking support ECU 10 is, specifically, as shown in FIGS. 2 and 3, configured to perform processing such as calculation of a parking route by hardware such as an I/O LSI 10a including an A/D converter and a CPU 10b, and software stored in a memory such as a ROM. The parking support ECU 10 includes a host vehicle position estimation unit 301, a parkable position calculation unit 302, an obstacle information analysis unit 303, and a parking route calculation unit 304.

The host vehicle position estimation unit 301 performs processing of calculating the speed of the host vehicle 1 from the wheel speed of the wheel 1W received from the wheel speed sensor 8, calculating the traveling direction of the host vehicle 1 from the steering angle of the steering wheel received from the steering angle sensor of the electric power steering device 6, and calculating a coordinate position of the host vehicle 1 from the vehicle speed and the traveling direction of the host vehicle 1. Note that, the method for calculating the coordinate position of the host vehicle 1 is not limited to this.

The result of the calculation is transmitted to the parkable position calculation unit 302 and the obstacle information analysis unit 303.

The parkable position calculation unit 302 performs processing of analyzing the external world information that is the environment information around the host vehicle 1 acquired by at least one of the camera 2 and the sonar 3, and calculating whether or not a parkable position exists around the coordinate position of the host vehicle 1 acquired from the host vehicle position estimation unit 301. As to the parkable position, there are cases where no positions are found, only one position is found, and a plurality of positions are found.

As an example of the calculation content, when there is a parking space equal to or greater than the full width, the total length, and the total height of the host vehicle 1, that is, when the calculation result indicates that there is a parkable position, around the host vehicle 1, the parkable position calculation unit 302 performs processing of setting the parkable position as a parking candidate, calculating the coordinate position of the parking candidate and the surrounding environment of the parking candidate, and transmitting the calculation result to the parking route calculation unit 304, the in-vehicle display device 9, and the vehicle control ECU 11.

In the in-vehicle display device 9, the parkable locations calculated and transmitted by the parkable position calculation unit 302, that is, the parkable spaces are displayed on the surrounding information of the host vehicle 1 being displayed on the in-vehicle display device 9 in an overlapped manner. The driver of the host vehicle stops the host vehicle 1 and can select a parking location of the host vehicle 1 from the parkable spaces based on the screen display of the in-vehicle display device 9. When the driver inputs parking support start using a button or voice, the input information is transmitted to the parking route calculation unit 304.

In the present embodiment, the environment information around the coordinates of the host vehicle 1 acquired by at least one of the camera 2 and the sonar 3 is described as an example of the input, but the calculation may be performed based on input information from a sensor using light. Further, in the present embodiment, when there is a parking space equal to or greater than the full width, the total length, and the total height of the host vehicle 1, the space is regarded as a parking candidate, but the parking candidate, that is, the parkable position of the host vehicle 1 may be calculated based on information such as a parking frame and a parking area guide sign.

The obstacle information analysis unit 303 analyzes external world information that is environmental information around the host vehicle 1 acquired by at least one of the camera 2 and the sonar 3, and calculates whether or not an obstacle exists around the coordinate position of the host vehicle 1 acquired from the host vehicle position estimation unit 301. Then, when the calculation result indicates that an obstacle exists, processing of calculating the coordinate information of the host vehicle and the reliability that is the likelihood of the obstacle is performed. The obstacle information analysis unit 303 preferably recognizes an obstacle more reliably in coordination with the external world information acquired by the camera 2 and the sonar 3, that is, by complementing the external world information acquired by the camera 2 and the external world information acquired by the sonar 3 with each other.

Although a method for determining the reliability of an obstacle is publicly known, in the case of means for measuring the distance between the host vehicle 1 and the obstacle using ultrasonic waves such as a sonar 3, noise may be included in the measurement result. Therefore, the reliability may be determined based on the continuity of points measured as obstacles (the length of the point sequence).

In the obstacle information analysis unit 303, when the length of the measured point sequence is long, the reliability as an obstacle is set to be high, and when the length of the measured point sequence is short, the reliability is set to be low. Further, in the obstacle information analysis unit 303, when an image is captured as in the case of the camera 2, if the amount of features extracted by edge detection or the like is large, the reliability as an obstacle is set to be high, and if the amount of features is small, the reliability as an obstacle is set to be low. Further, when an obstacle is detected at the same position by the camera 2 and the sonar 3, the reliability of the obstacle is considered to be high, and thus the reliability may be set to be high.

The coordinate information of the obstacle and its reliability analyzed by the obstacle information analysis unit 303 are transmitted to the parking route calculation unit 304 and the vehicle control ECU 11.

For example, the parking route calculation unit 304, when having received a signal indicating that the parking support start button is pressed from the in-vehicle display device 9, performs processing of calculating the parking route from the stop position of the host vehicle 1 to the above-mentioned target parking position selected by the driver. The parking route is calculated based on the coordinate information of the obstacle and its reliability analyzed by the obstacle information analysis unit 303. The calculated parking route information is transmitted to the vehicle control ECU 11.

Specifically, the calculation of the parking route by the parking route calculation unit 304 is performed by setting the distance between the obstacle and the host vehicle 1 according to a degree of reliability of the obstacle information set by the obstacle information analysis unit 303. When the reliability of the obstacle information set by the obstacle information analysis unit 303 is w, the parking route calculation unit 304 calculates the parking route by setting a long distance (margin) between the obstacle and the host vehicle 1. When the reliability of the obstacle information set by the obstacle information analysis unit 303 is high, the parking route is calculated by setting a short distance (margin) between the obstacle and the host vehicle 1.

In addition, when the reliability of the obstacle information set by the obstacle information analysis unit 303 is low, the parking route calculation unit 304 calculates the parking route including a route that moves in parallel along the obstacle based on the obstacle information acquired by the sonar 3. Further, the parking route calculation unit 304 may first calculate the parking route from the start point to the end point, may recalculate the parking route under the condition that the vehicle is turned back between the start point and the end point of the parking route, or may calculate the parking route sequentially at predetermined time intervals between the start point and the end point of the parking route. Each parking route calculated by the parking route calculation unit 304 is transmitted to and displayed on the in-vehicle display device 9.

The vehicle control ECU 11 has a function of controlling the host vehicle 1 so that the host vehicle 1 travels along the parking route calculated by the parking route calculation unit 304, and the driver can receive the parking support during stop of the host vehicle 1 or during driving operation of the host vehicle 1 so that the host vehicle 1 is parked at the target parking position.

Specifically, the vehicle control ECU 11, in order to support a driving operation of the host vehicle 1 to the parkable location based on the parking route transmitted from the parking support ECU 10, has a function of controlling to support any one or all of the driver's steering wheel operation, accelerator operation, brake operation, and the like.

The support of driving operation is performed by, for example, outputting target steering angle information to the electric power steering device 6 and outputting a required driving force to a driving force control ECU (not shown) that controls the driving force of the host vehicle 1. Also, the support is performed by controlling a speed of the host vehicle 1 by outputting a required braking force to a braking force control ECU (not shown) that controls the braking force of the host vehicle 1, and by controlling a shift range of the host vehicle by outputting a request for a drive range, a reverse range, or a parking range to a shift-by-wire control device (not shown) that controls the shift range of an automatic transmission.

Hereinafter, parking route evaluation processing by the parking support ECU 10 will be described with reference to the flowchart shown in FIG. 4.

Figure 4:
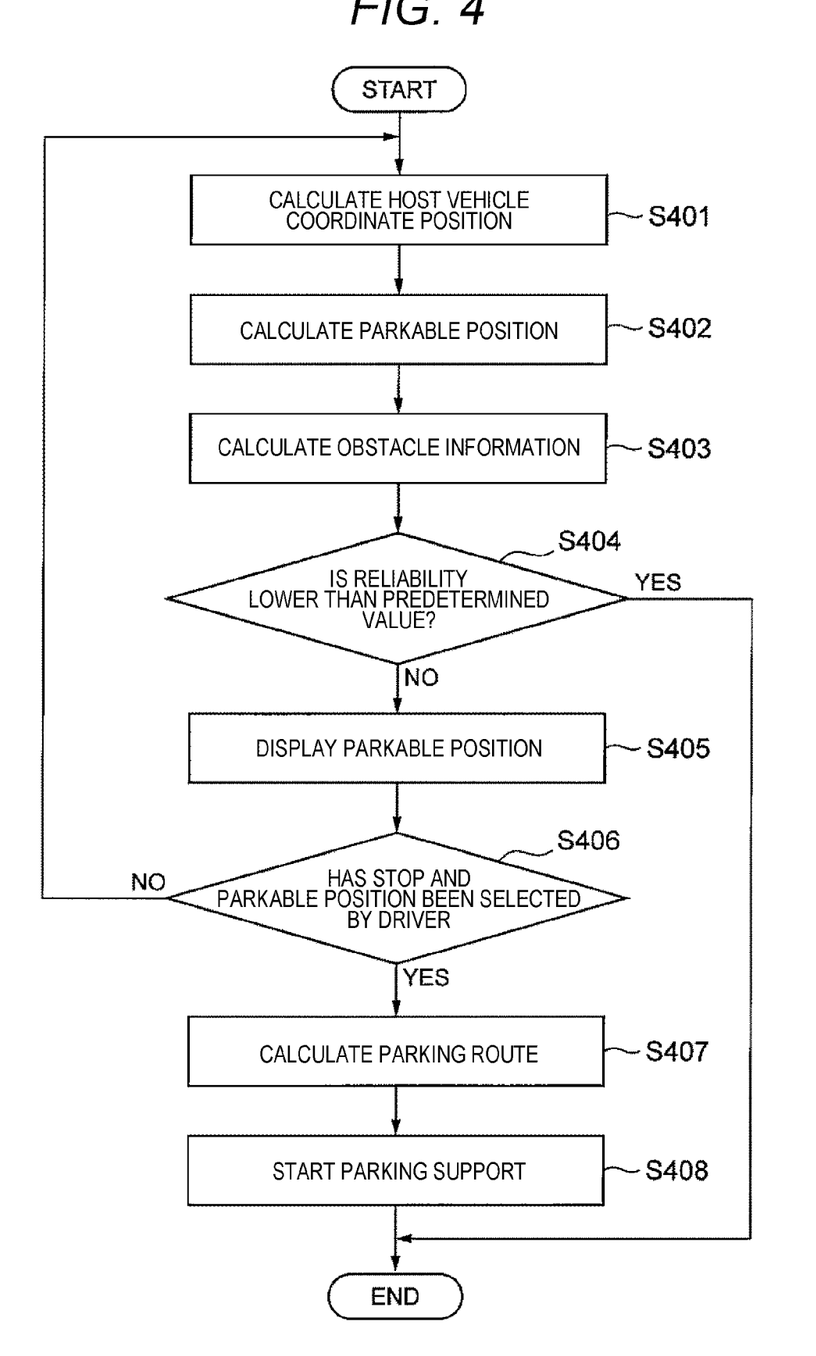
FIG. 4 is a flowchart showing a parking route evaluation processing procedure performed by the parking support ECU constituting the parking support device according to the embodiment of the present invention.

The parking route evaluation processing includes, as shown in FIG. 4, calculation of host vehicle coordinate position (step S401), parkable position calculation (step S402), obstacle information calculation (step S403), determination of whether reliability is lower than a predetermined value (step S404), parkable position display (step S405), stop and parking position selection by driver (step S406), parking route calculation (step S407), and parking support start (step S408).

Each step is performed in order.

In step S401, the driver of the host vehicle 1 is manually driving the host vehicle 1, and the speed of the host vehicle 1 is calculated by the host vehicle position estimation unit 301 from the wheel speed of the wheel 1W received from each wheel speed sensor 8 at that time. The traveling direction of the host vehicle 1 is calculated by the host vehicle position estimation unit 301 from the steering angle of the steering wheel received from the steering angle sensor of the electric power steering device 6, and the coordinate position of the host vehicle 1 is calculated by the host vehicle position estimation unit 301 from the vehicle speed and the traveling direction of the host vehicle 1.

In step S402, the environmental information around the host vehicle 1 acquired by at least one of the camera 2 and the sonar 3 is calculated by the parkable position calculation unit 302, and the parkable position of the host vehicle 1 is calculated.

Next, in step S403, environmental information around the host vehicle 1 acquired by at least one of the camera 2 and the sonar 3 is calculated, and the obstacle information analysis unit 303 analyzes whether or not an obstacle exists. When the analysis result indicates that an obstacle exists, the coordinate information of the obstacle and the reliability of the obstacle are calculated.

In step S404, the parking support ECU 10 determines whether the reliability calculated by the obstacle information analysis unit 303 in step S403 is lower than a predetermined value. When it is determined that the reliability is lower than the predetermined value, the parking route evaluation processing ends, the parking route is not calculated, and the parking support is not started. When it is not determined that the reliability is lower than the predetermined value, the process proceeds to step S405. Note that the predetermined value is appropriately selected based on the external world information of the host vehicle 1 acquired by at least one of the camera 2 and the sonar 3, setting information in the parking support ECU 10, and data such as experimental values. Specifically, when the reliability is set to 1 as the lowest and 5 as the highest, for example, the predetermined value can be set as a value about less than 1.

In step S405, the parkable position calculated in step S402 is displayed on the surrounding information of the host vehicle 1 in an overlapped manner on the in-vehicle display device 9.

In step S406, the driver of the host vehicle 1 stops the host vehicle 1, the parkable position displayed on the in-vehicle display device 9 is selected by the driver, and it is determined whether the parking support start is input by the driver of the host vehicle 1. The parkable position selected by the driver is set as a target parking position. When it is determined that the parking support start has been input, the process proceeds to step S407, and when it is determined that it has not been input, the process returns to step S401.

In step S407, the parking route calculation unit 304 calculates a parking route from the stop position of the host vehicle 1 to the target parking position selected in step S406.

In step S408, with the release of the brake of the host vehicle 1 by the driver of the host vehicle 1 or the depression of the parking support start button displayed on the in-vehicle display device 9 as a trigger, parking support for parking at the target parking position of the host vehicle 1 is started, and the driver's driving operation is supported by the parking support ECU 10 and the vehicle control ECU 11.

Next, the calculation processing of the parking route in step S407 will be described with reference to the drawings.

Figure 5:
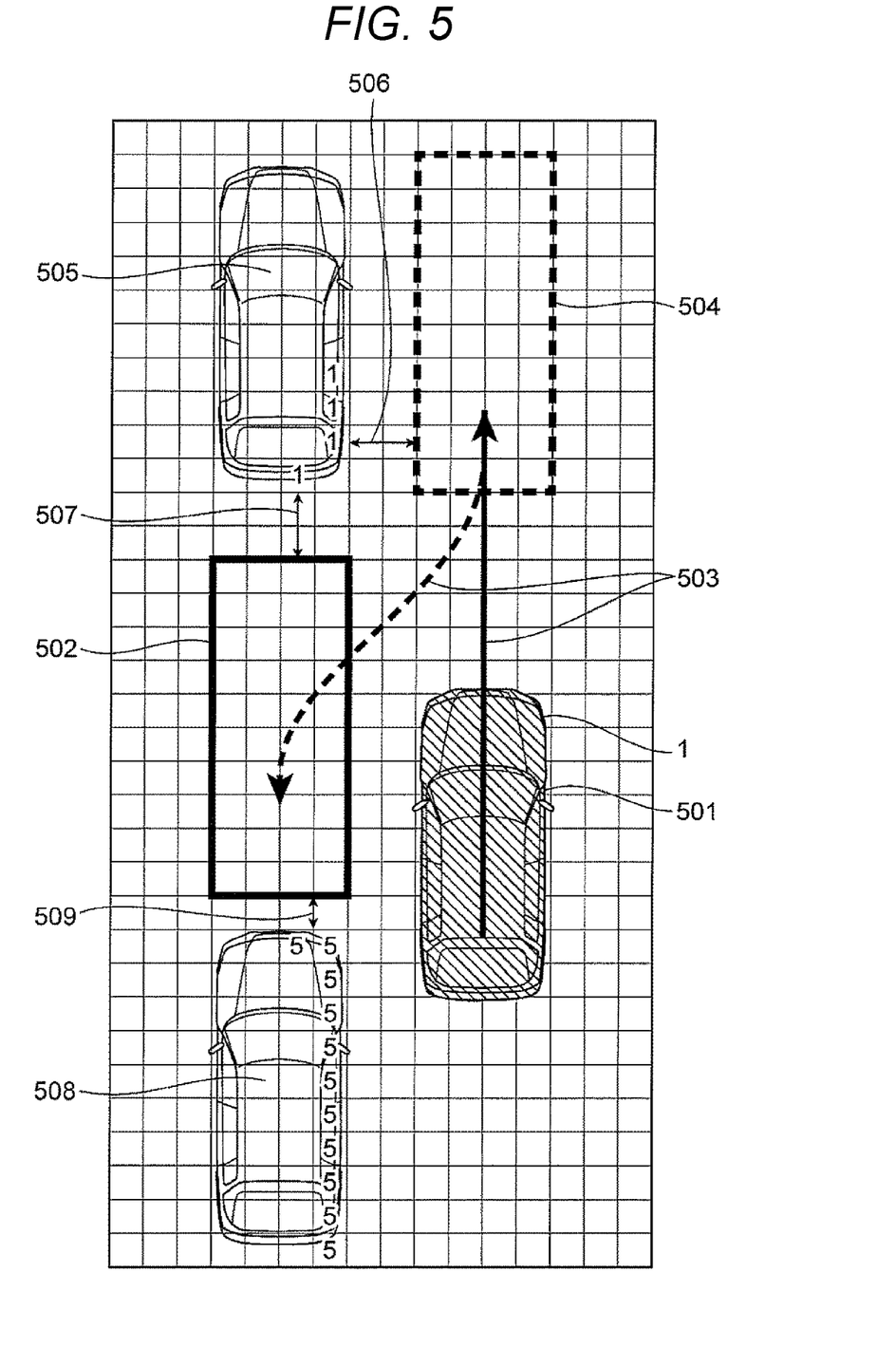
FIG. 5 is an explanatory drawing for explaining reliability of obstacle information when the host vehicle is parked in tandem analyzed by an obstacle information analysis unit of the parking support ECU constituting the parking support device according to the embodiment of the present invention and parking route calculation processing contents.

First, the calculation of the parking route shown in FIG. 5 will be described. The square grids in FIG. 5 are described for convenience of description, and the numbers described in the grids indicate the reliability of the obstacle information obtained as a result of analysis by the obstacle information analysis unit 303. The reliability can be quantified, for example, 1 is the lowest and 5 is the highest. An area where no numerical value is described indicates that an obstacle has not been detected by at least one of the camera 2 and the sonar 3. Note that one side of the grid shown in FIG. 5 is about 0.5 m, and the width of the host vehicle 1 is about 1.8 m. In the present embodiment, the position of the host vehicle 1 is determined based on the midpoint of a line segment connecting the left and right rear wheels of the host vehicle 1.

A stop position 501 indicates the stop position of the host vehicle 1. In the parking support, the parking route calculation unit 304 calculates a parking route 503 for parking from the stop position 501 to a target parking position 502 selected as a location for parking by the driver. Reference numeral 504 denotes a location where the host vehicle 1 is turned back from forward to backward or from backward to forward in the middle of the parking route 503. When the parking route 503 is calculated, the calculation is performed so as not to contact each obstacle, but a margin (hereinafter, referred to as a margin), which is a distance between the host vehicle 1 and the obstacle for the purpose of not contacting the obstacle, is changed depending on the reliability of the obstacle information.

In the case of the calculation processing of the parking route shown in FIG. 5, a part of the obstacle 505 in front of the target parking position 502 is detected by the camera 2 and the sonar 3, but their reliabilities are all low (indicated by 1 in FIG. 5). In this case, since the position of the obstacle 505 in front of the target parking position 502 detected by at least one of the camera and the sonar 3 is likely to be far from the actual position, when the route is calculated, a large margin 506 and a large margin 507 are taken, and thus contact with the obstacle 505 is prevented to ensure safety during parking support.

Although a part of the obstacle 508 behind the target parking position 502 is detected by the camera 2 and the sonar 3, its reliability is all high (indicated by 5 in FIG. 5). In this case, since the position of the obstacle 508 behind the target parking position 502 detected by at least one of the camera 2 and the sonar 3 is likely to be near to the actual position, when the route is calculated, a small margin 509 is taken, and thus, a space in which the host vehicle can travel during parking support can be widened. Therefore, it is possible to provide the parking route 503 with flexibility and to reduce the uncomfortable feeling and unnaturalness to the parking route 503 felt by the driver.

Further, when it is necessary to pass near an obstacle (in FIG. 5, indicated by the obstacle 505 ahead) with low reliability in the route after the turnback, it is configured to draw a route in which an obstacle with low reliability can be detected easily. As an example, since the sonar 3 has high accuracy in distance measurement itself, but low accuracy in angle, a route that runs in parallel to a group of obstacles detected with respect to the obstacle 505 ahead is calculated, and thus the reliability of the obstacle 505 ahead can be increased. When the reliability increases, the route is recalculated at the turnback position, so that a route with higher safety and higher convenience can be obtained.

Further, as described above, when there is an obstacle whose reliability is lower than a predetermined value, there is a possibility to contact the obstacle, and therefore the calculation processing of the parking route 503 may not be performed and the parking support may not be started.

Figure 6:
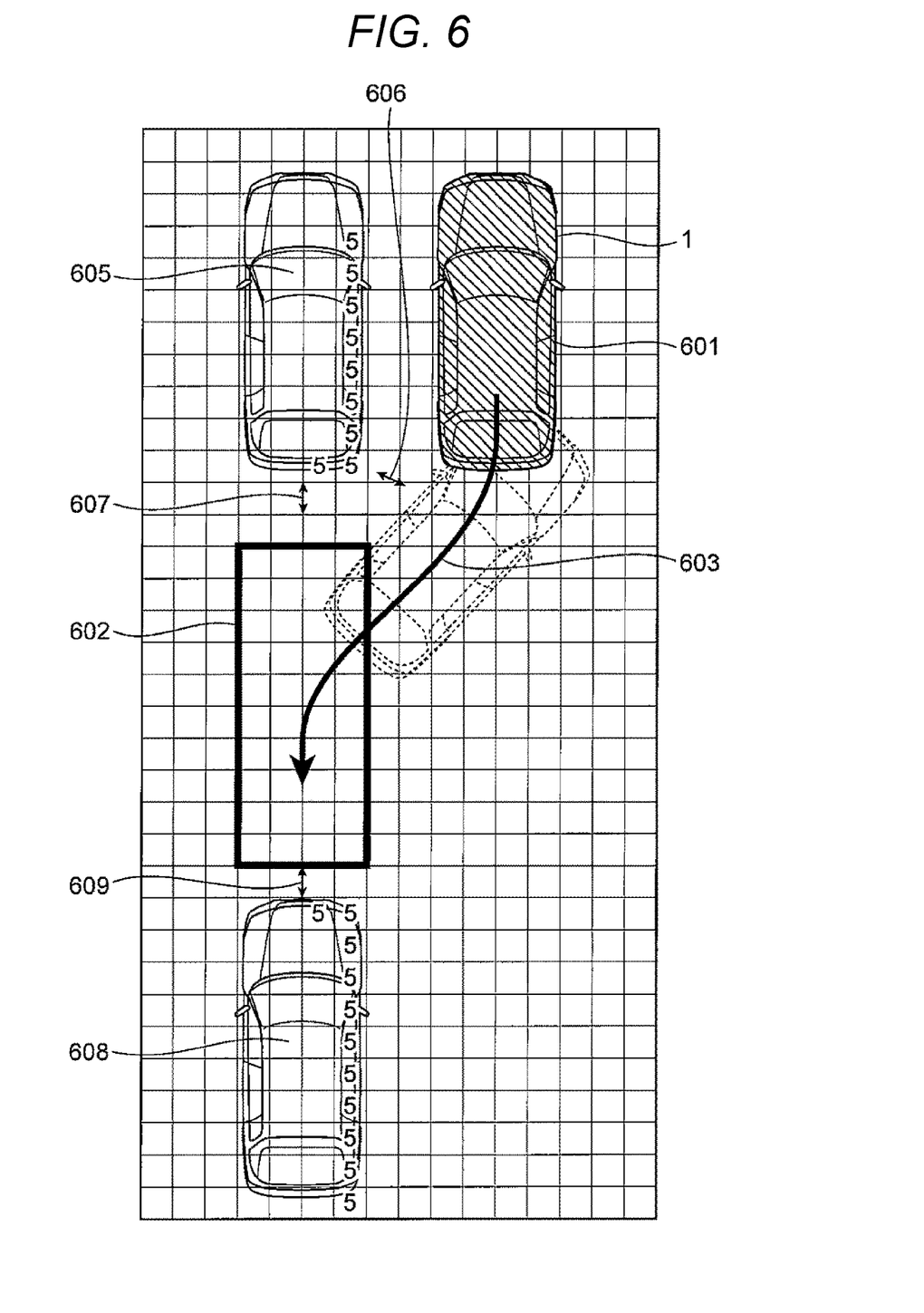
FIG. 6 is an explanatory drawing for explaining reliability of obstacle information when the host vehicle is parked in tandem analyzed by an obstacle information analysis unit of the parking support ECU constituting the parking support device according to the embodiment of the present invention and parking route calculation, processing contents, and shows a state of high reliability.

Next, the calculation processing of the parking route shown in FIG. 6 takes tandem parking as an example as in the case of the calculation processing of the parking route shown in FIG. 5, and is an example when the reliability of the obstacle information detected with respect to the obstacle 605 ahead is all high (indicated by 5 in FIG. 6).

The stop position 601 indicates the stop position of the host vehicle 1. In the parking support, the parking route 603 for parking from the stop position 601 to the target parking position 602 selected as the location for parking by the driver is calculated in the parking route calculation unit 304.

When the parking route 603 is calculated, the calculation is performed so as not to contact each obstacle, but a margin for not contacting the obstacle is changed depending on the reliability of the obstacle information.

In the case of the calculation processing of the parking route shown in FIG. 6, a part of the obstacle 605 in front of the target parking position 602 is detected by the camera 2 and the sonar 3, but the reliability is all high (indicated by 5 in FIG. 6). In this case, the detected position of the obstacle 605 ahead is likely to be close to the actual position thereof. Therefore, when calculating the parking route 603, it is possible to widen the space that can be traveled during parking support by reducing the margin 606 and the margin 607. Therefore, it is possible to provide the parking route 603 with flexibility and to reduce the uncomfortable feeling and unnaturalness to the parking route 603 felt by the driver.

In the calculation processing of the parking route shown in FIG. 6, the stop position 601 is set as the parking support start position, but the turnback position during parking support may be set. In this case, when the vehicle stops at the turnback position, the parking route 603 from the stop position 601 to the target parking position 602 is calculated based on the latest obstacle information and its reliability, and the margin is also set similarly based on the reliability of the obstacle. This makes it possible to reflect newer and more accurate obstacle information in the parking route 603, thereby further improving the convenience of the parking support function.

Figure 7:
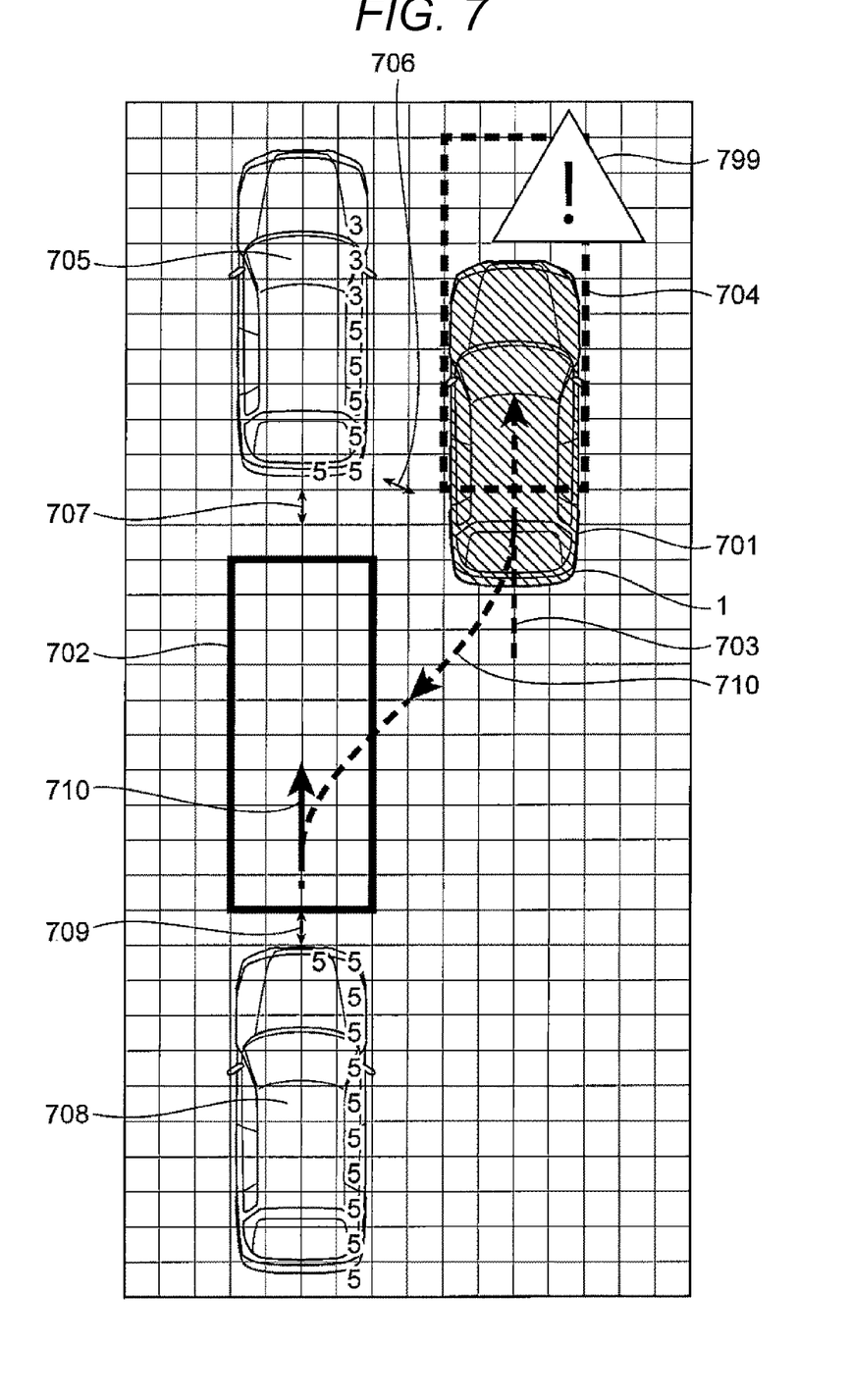
FIG. 7 is an explanatory drawing for explaining reliability of obstacle information when the host vehicle is parked in tandem analyzed by an obstacle information analysis unit of the parking support ECU constituting the parking support device according to the embodiment of the present invention and parking route calculation processing contents, and shows a state in which the vehicle is stopped in front of a turnback position during parking support.

Next, the calculation processing of the parking route shown in FIG. 7 takes tandem parking as an example as in the calculation processing of the parking route shown in FIGS. 5 and 6, and is an example when the driver finds an undetected obstacle 799 in front of the host vehicle 1 while traveling on the parking route 703 toward the turnback position 704 during parking support and stops the vehicle in front of the turnback position 704 in order to avoid a collision.

In order to restart the parking support, the parking support device 10 calculates, in the parking route calculation unit 304, a parking route 710 that takes a direction away from the undetected obstacle 799 from the stop position 701 of the host vehicle 1 toward the target parking position 702 as a start direction. When the parking route 710 is calculated, the calculation is performed so as not to contact each obstacle, but a margin for not contacting the obstacle is changed depending on the reliability of the obstacle information.

In the case of the calculation processing of the parking route shown in FIG. 7, the camera 2 and the sonar 3 detect a part of the obstacle 705 in front of the target parking position 702 and a part of the obstacle 708 behind the target parking position 702, but their r liabilities are all high (indicated by 5 in FIG. 7). In this case, with respect to each of the obstacles 705 and 708 existing ahead and behind, there is a high possibility that the position of the obstacle detected by at least one of the camera 2 and the sonar 3 is close to the actual position. Therefore, when calculating the parking routes 703, 710, by reducing the margin 706, the margin 707, and the margin 709, it is possible to widen the space that can be traveled during parking support, to provide the parking routes 703, 710 with flexibility, and to reduce also the number of times of turnback.

In the calculation processing of the parking route shown in FIG. 7, the case where an undetected obstacle 799 exists ahead in the traveling direction during parking support has been described as an example, but in addition, the present invention can be applied also to the case where the driver manually changes a shift lever from forward to reverse while continuing parking support.

Next, effects of the parking support device 10 according to the present embodiment will be described.

The parking support device 10 according to the present embodiment includes the obstacle information analysis unit 303 that acquires the external world information detected by the camera 2 and the sonar 3, and recognizes the external world from the external world information, and the parking route calculation unit 304 that calculates the parking route of the host vehicle 1 based on the information on the obstacles in the external world recognized by the obstacle information analysis unit 303, and the parking route calculation unit 304 has a configuration to set the distance between the obstacle and the host vehicle 1 on the parking route according to the degree of reliability of the obstacle information recognized by the obstacle information analysis unit 303.

With this configuration, when the parking route followed by the host vehicle 1 is calculated, the distance between the obstacle and the host vehicle 1 on the parking route is set based on the reliability of the obstacle information acquired by the camera 2 and the sonar 3 mounted on the host vehicle 1.

For example, when the reliability of the obstacle information acquired by the obstacle information analysis unit 303 is low, a parking route in which the distance between the obstacle and the host vehicle 1 is set to be long is calculated.

When the reliability of the obstacle information acquired by the obstacle information analysis unit 303 is high, a parking route in which the distance between the obstacle and the host vehicle 1 is set to be short is calculated. Therefore, it is possible to prevent the margin from being unnecessarily increased, and to provide the driver with no unnaturalness, thereby improving the convenience and giving an effect of providing safe parking support.

Further, according to the parking support device 10 according to the present embodiment, when the reliability of the obstacle information acquired by the obstacle information analysis unit 303 is low, since the parking support device 10 is configured to calculate based on the information of the obstacle in the external world acquired by the sonar 3, and calculate a parking route including a route that moves in parallel along the obstacle, an effect of making it possible to increase the reliability of obstacle information in the obstacle information analysis unit 303 is obtained.

Further, according to the parking support device 10 according to the present embodiment, the parking support device 10, when calculating the parking route, calculates the parking route by calculating from the start point to the end point of the parking route, and supports the driving operation based on the calculated parking route. Therefore, an effect that convenience is improved and parking support is performed safely is obtained.

In addition, according to the parking support device according to the present embodiment, when the host vehicle is turned back while the host vehicle moves from the start point to the end point of the parking route, the parking support device 10 recalculates the parking route, and supports the driving operation based on the recalculated parking route. Therefore, an effect that parking support is performed more safely is obtained.

In addition, according to the parking support device 10 according to the present embodiment, the parking support device 10 updates the parking route by sequentially calculating the parking route while the host vehicle moves from the start point to the end point of the parking route, and supports the driving operation based on the updated parking route. Therefore, an effect that parking support is performed more safely is obtained.

Further, according to the parking support device 10 according to the present embodiment, since the obstacle information analysis unit 303 calculates the reliability by recognizing the obstacle in cooperation with the external world information acquired from the camera 2 and the sonar 3, it is possible to obtain an effect that an obstacle can be more reliably recognized and more reliable reliability can be calculated.

Further, according to the parking support device 10 according to the present embodiment, when the reliability of the obstacle information calculated by the obstacle information analysis unit 303 is lower than a predetermined value, the parking route is not calculated, and therefore parking support is not started. Therefore, the driver is prevented from parking at a parking position where parking is difficult, and an effect that the safety of the driving operation is further improved is obtained.

As described above, in the parking support device 10 of the present embodiment, since the parking support device 10, when calculating the parking route of the host vehicle 1, sets the margin between the host vehicle and the obstacle based on the reliability of the obstacle information, it is possible to improve both safety and convenience of the parking support.

Note that the parking support device of the present invention is not limited to the parking support device 10 according to the present embodiment, but includes various embodiments. The present embodiment has been described in detail in order to explain the present invention in an easy-to-understand manner, and is not necessarily limited to those having all the described configurations. For example, the calculation processing of the parking route shown in FIGS. 5, 6, and 7 has been described by taking tandem parking as an example, but also in the case of parallel parking, the calculation processing of the parking route can be performed similarly to the case of tandem parking.

Further, each configuration, function, processing unit, processing means, and the like of the parking support device 10 according to the present embodiment may be realized by hardware, for example, by designing a part or all of them using an integrated circuit. Further, each configuration and function of the parking support device 10 according to the present embodiment may be realized by software by the processor interpreting and executing a program that realizes each function. Information such as a program, a table, and a file for realizing each function can be placed in a memory, a hard disk, a storage device including a solid state drive (SSD), or a recording medium such as an IC card, an SD card, or a DVD.

Further, the control lines and the information lines are considered to be necessary for the explanation, and not all the control lines and the information lines are necessarily shown in the parking support device 10 according to the present embodiment. In practice, almost all configurations may be considered to be mutually connected.

As described above, the embodiments of the present invention have been described in detail. However, the present invention is not limited to the above embodiments, and various design changes may be made within a range not departing from the spirit of the present invention described in the appended claims. For example, the above-described embodiments have been described in detail in order to explain the present invention in an easy-to-understand manner, and are not necessarily limited to those having all, the described configurations. Further, a part of the configuration of one embodiment can be replaced with the configuration of another embodiment, and the configuration of one embodiment can be added to the configuration of another embodiment. Further, other components may be added to, deleted from, or substituted for a part of the configuration of each embodiment.

REFERENCE SIGNS LIST

1 host vehicle
1FL front left wheel
1FR front right wheel
1RL rear left wheel
1RR rear right wheel
1W wheel
2 camera (external world information acquisition unit)
2F front camera
2B rear camera
2L left camera
2R right camera
3 sonar (external world information acquisition unit)
6 electric power steering device
8 wheel speed sensor
8FL front left wheel speed sensor
8FR front right wheel speed sensor
8RR rear right wheel speed sensor
8RL rear left wheel speed sensor
9 in-vehicle display device
10 parking support ECU (parking support device)
10*a* I/O LSI (vehicle control device)
10*b* CPU (vehicle control device)
11 vehicle control ECU
301 host vehicle position estimation unit
302 parkable position calculation unit
303 obstacle information analysis unit (external world recognition unit)
304 parking route calculation unit (vehicle control device)
501, 601, 701 stop position
502, 602, 702 target parking position
503, 603, 703, 710 parking route
505, 508, 605, 608, 705, 708, 799 obstacle
506, 507, 509, 606, 607, 609, 706, 707, 709 margin
704 turnback position
799 undetected obstacle

The invention claimed is:
1. A parking support device for supporting parking of a host vehicle, the parking support device comprising:
a sensor configured to acquire external world information;
at least one processor configured to:
recognize an external world from the external world information acquired by the sensor;
calculate a parking route of the host vehicle based on information on an obstacle in the recognized external world; and
set a distance between the obstacle and the host vehicle in the parking route according to a degree of reliability of the information on the obstacle; and
a controller configured to cause the host vehicle to move based on the calculated parking route,
wherein the at least one processor is configured to:
set a longer distance between the obstacle and the host vehicle in the parking route when the reliability of the information on the obstacle is lower,
calculate, when the reliability of the information on the obstacle is lower, a parking route including a route that moves in parallel along the obstacle based on the information on the obstacle in the external world detected by the sensor,
not calculate the parking route when the reliability of the information on the obstacle is lower than a predetermined value, and
set the degree of reliability to be higher when an amount of features of the obstacle is larger.
2. The parking support device according to claim 1, wherein the at least one processor is configured to set a shorter distance between the obstacle and the host vehicle in the parking route when the reliability of the information on the obstacle is higher.
3. The parking support device according to claim 1, wherein
the sensor includes at least one of a camera or a sonar, and the at least one processor is configured to recognize the obstacle in cooperation with the external world information acquired from the camera and the sonar.

4. The parking support device according to claim 1, wherein the at least one processor is configured to, when calculating the parking route, calculate from a start point to an end point of the parking route.

5. The parking support device according to claim 1, wherein the at least one processor is configured to recalculate the parking route when the host vehicle is turned back while the host vehicle moves from a start point to an end point of the parking route.

6. The parking support device according to claim 1, wherein the at least one processor is configured to sequentially calculate and update the parking route while the host vehicle moves from a start point to an end point of the parking route.

* * * * *